United States Patent Office.

SAMUEL PITCHER, OF BARNSTABLE, MASSACHUSETTS.

*Letters Patent No. 77,758, dated May 12, 1868.*

IMPROVED MEDICINE.

*The Schedule referred to in these Letters Patent and making part of the same.*

TO ALL PERSONS TO WHOM THESE PRESENTS MAY COME:

Be it known that I, SAMUEL PITCHER, of Barnstable, in the county of Barnstable, and State of Massachusetts, have invented a new and useful Composition, to be employed as a cathartic, or substitute for castor-oil, in the treatment of disease; and I do hereby declare the same to be fully described in the following specification.

The ingredients of the composition are senna-leaves, bicarbonate of soda, extract of taraxicum, essence of wintergreen, and sugar.

To make the composition, take twenty pounds of senna-leaves, two ounces of the bicarbonate of soda, five pounds of the essence of wintergreen, one pound of the extract of taraxicum, fifty pounds of sugar, and ten gallons of water.

The process of compounding such ingredients may be thus set forth:

First, raise the temperature of the water to the boiling-point, and then add the bicarbonate of soda. Next, add the senna-leaves, and allow the temperature of the liquid to fall to 150° Fahrenheit, or thereabouts, and keep it at or about at such temperature for about two hours. Next, strain the liquid, or remove from it the solid matters, after which they are to be pressed in a powerful press, and the liquid expelled from them should be added to the rest of the liquid, or that strained out of them. Next, add to the liquid the sugar, keeping the temperature of the liquid at about 150° Fahrenheit. Next, add the extract of taraxicum. This extract is well known in commerce, it being commonly sold by druggists, who prepare it in accordance with a well-understood formula, which is set forth in the "United States Dispensatory," which is a published or printed work in general use.

After the sugar may have been thoroughly dissolved, the temperature of the liquid should be reduced to that of the surrounding atmosphere, after which the essence of wintergreen may or should be added. The whole should be stirred so as to thoroughly incorporate the ingredients. The result is a sirupy compound, which has all the advantages of castor-oil, besides useful properties not incident thereto.

The alkali, besides neutralizing any acid, should there be any in any of the ingredients, prevents fermentation, and also operates to prevent the drastic effect of the same. The essence of wintergreen operates to prevent the griping usually incident to the employment of senna. The wintergreen, as well as the bicarbonate of soda, also operates to neutralize the unpleasant taste of the senna. The taraxicum, besides having a hepatic action, operates as an alterative. The sugar, while acting with the water as a vehicle for the other ingredients, is productive of useful effects, as it tends to the relief of and prevents inflammation of the stomach and alimentary canal.

I would remark that instead of the bicarbonate of soda, there are other alkaline carbonates, which may be employed as a substitute. There are other essences, or there are essential oils, which will produce like effects.

I would also remark that I do not limit my invention to the precise proportions mentioned of its ingredients, as hereinbefore set forth, as such may be varied somewhat without materially changing its character or properties.

This pleasant and efficient composition may be employed to great advantage as a medicine, particularly in cases where castor-oil has generally been considered useful or necessary. It is an excellent remedy for colds, inflammations, or bilious attacks.

An ordinary dose for a child is from one to three teaspoonfuls, and for an adult from one to three tablespoonfuls.

I claim as my invention—

The composition substantially as described, and for the purpose as explained.

I also claim the process hereinbefore described for compounding the ingredients of such composition, such process embracing the two operations of straining the liquor from the leaves, and subsequently obtaining, by pressure of them, one extract, not obtainable by simple infusion.

SAMUEL PITCHER.

Witnesses:
R. H. EDDY,
SAMUEL N. PIPER.